United States Patent [19]
Brakebill

[11] 4,213,233
[45] * Jul. 22, 1980

[54] METHOD OF MAKING A PILOT OPERATED VALVE POSITIONER

[75] Inventor: Harold G. Brakebill, Concord, Tenn.

[73] Assignee: Robertshaw Controls Company, Richmond, Va.

[*] Notice: The portion of the term of this patent subsequent to Mar. 13, 1996, has been disclaimed.

[21] Appl. No.: 968,022

[22] Filed: Dec. 11, 1978

Related U.S. Application Data

[62] Division of Ser. No. 800,299, May 25, 1975, Pat. No. 4,143,850.

[51] Int. Cl.² ............... B23P 15/00; F16K 31/12
[52] U.S. Cl. .................................. 29/157.1 R
[58] Field of Search ............ 29/157.1 R; 251/28; 91/387

[56] References Cited

U.S. PATENT DOCUMENTS

| | | | |
|---|---|---|---|
| 2,687,868 | 8/1954 | Barrett et al. | 251/28 |
| 3,079,898 | 3/1963 | Jensen | 91/387 |

*Primary Examiner*—Daniel C. Crane
*Attorney, Agent, or Firm*—Candor, Candor & Tassone

[57] ABSTRACT

A pilot operated valve positioner having a pilot valve unit operated by a pneumatic signal to pneumatically operate an actuator unit carrying a main valve member to position the same relative to its main valve seat in a valve unit in relation to the magnitude of the pneumatic signal, the actuator unit having a range spring and a feedback spring for the pilot valve unit. The springs are coiled compression springs and are substantially concentrically mounted. The pilot valve unit has a feedback positioning diaphragm and part of its housing concentrically disposed in one end of the range spring to render the valve positioner relatively small and compact.

5 Claims, 1 Drawing Figure

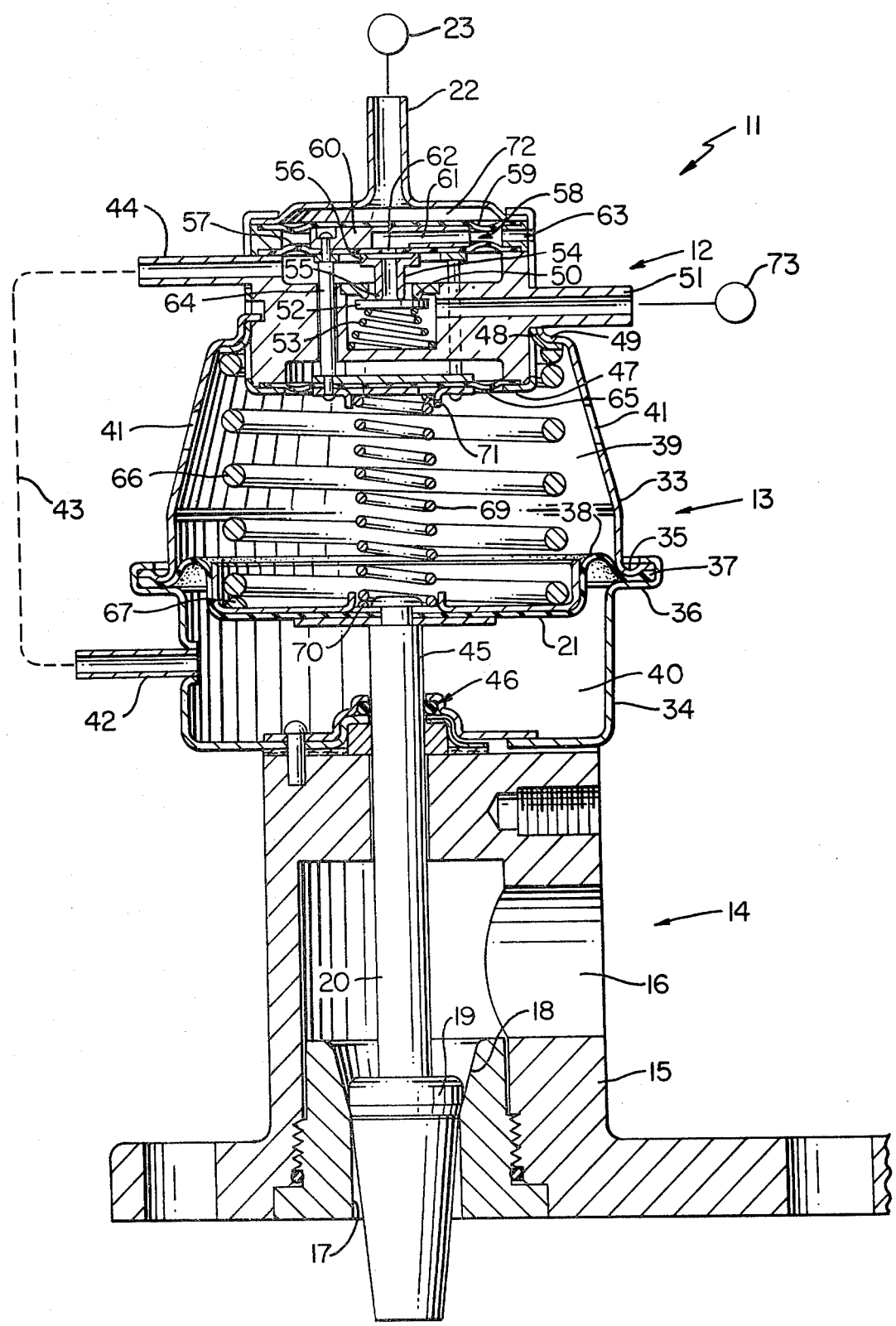

METHOD OF MAKING A PILOT OPERATED VALVE POSITIONER

This application is a divisional patent application of its copending parent application, Ser. No. 800,299, filed May 25, 1977, now U.S. Pat. No. 4,143,850 issued Mar. 13, 1979.

This invention relates to a pilot operated valve positioner and to a method of making the same.

It is well known to provide a pilot operated valve positioner having pilot valve means operated by a pneumatic signal to pneumatically operate an actuator means carrying a main valve member to position the same relative to its main valve seat in a valve unit in relation to the magnitude of the pneumatic signal.

However, it has been found, according to the teachings of this invention, that such a pilot operated valve positioner can be uniquely arranged in a manner hereinafter set forth to render the valve positioner relatively small and compact.

Such pilot operated valve positioner of this invention readily lends itself to be an exhaust gas recirculation valve unit for an internal combustion engine to be operated by the signal conditioner system of applicant's copending patent application, Ser. No. 800,211, filed May 25, 1977, now U.S. Pat. No. 4,099,539, or other signal producing means as desired.

In particular, the pilot operated valve positioner of this invention has the range spring and the pilot valve means feedback spring formed as coiled compression springs that are disposed substantially concentrically in an atmospheric chamber of the actuator unit. The pilot valve means has a feedback positioning diaphragm means and part of its housing means concentrically disposed in one end of the range spring to render the valve positioner relatively small and compact as well as substantially leak proof.

Accordingly, it is an object of this invention to provide an improved pilot operated valve positioner having one or more of the novel features of this invention as set forth above or hereinafter shown or described.

Another object of this invention is to provide a method of making such a pilot operated valve positioner, the method of this invention having one or more of the novel features of this invention as set forth above or hereinafter shown or described.

Other objects, uses and advantages of this invention are apparent from a reading of the description which proceeds with reference to the accompanying drawings forming a part thereof and wherein:

The single FIGURE of the drawings is an enlarged, fragmentary, cross-sectional view illustrating the improved pilot operated valve positioner of this invention.

While the various features of this invention are hereinafter described and illustrated as being particularly adapted to provide a pilot operated valve positioner to operate as an exhaust gas recirculation valve for an internal combustion engine, it is to be understood that the various features of this invention can be utilized singly or in any combination thereof to provide a pilot operated valve positioner for other uses as desired.

Therefore, this invention is not to be limited to only the embodiment illustrated in the drawings, because the drawings are merely utilized to illustrate one of the wide variety of uses of this invention.

Referring now to the drawings, the improved pilot operated valve positioner of this invention is generally indicated by the reference numeral 11 and includes three units 12, 13, and 14 disposed in stacked aligned relation to provide a self-contained pilot operated valve positioner 11, the unit 12 comprising a pilot valve means, the unit 13 comprising an actuator means, and the unit 14 comprising a main valve means.

The main valve means or unit 14 includes a housing means 15 having an inlet 16 and an outlet 17 with substantially a frusto-conical valve seat 18 therebetween adapted to be controlled by a movable valve member 19 having its stem 20 interconnected to a movable diaphragm means 21 of the actuator unit 13 to be controlled thereby in a manner hereinafter described.

The actuator unit 13 and pilot valve unit 12 cooperate in a manner hereinafter described to position the valve member 19 of the valve unit 14 in various open positions thereof relative to the valve seat 18 in accordance with the magnitude of a changeable pneumatic signal being directed to a nipple means 22 of the pilot valve unit 12 from a signal producing source 23, such as the signal producing source of the aforementioned co-pending patent application.

Also, it may be found that an electronic system can be utilized to direct a changing pneumatic signal to the pilot valve means 12 even though the pilot operated valve positioner 11 of this invention is to be utilized as an exhaust gas recirculation valve for an internal combustion engine or the like and be operated by vacuum rather than by pressure.

In any event, the details and the operation of the pilot operated valve positioner 11 of this invention will now be described.

As illustrated, the actuator unit 13 includes two substantially cup-shaped housing parts 33 and 34 having their open ends 35 and 36 crimped together to hold the outer peripheral means 37 of a flexible diaphragm 38 therebetween, the flexible diaphragm 38 forming part of the diaphragm means 21 of the actuator means 13 and dividing the housing means 33, 34 thereof into two chambers 39 and 40 on opposite sides thereof.

The chamber 39 of the actuator unit 13 is adapted to be interconnected to the atmosphere through suitable vent openings 41 formed in the housing means 33.

The chamber 40 of the actuator unit 13 is sealed from the atmosphere and is adapted to be interconnected by a nipple means 42 to a conduit means 43 that is interconnected to an outlet nipple 44 of the pilot unit 12 for a purpose hereinafter described.

The valve stem 20 of the valve unit 14 has its upper end 45 projecting through suitable seal means 46 in the housing means 34 of the actuator unit 13 to be fastened to the diaphragm means 21 in any suitable manner so that the valve stem 20 will be moved upwardly and downwardly upon upward and downward movement of the diaphragm means 21 of the actuator unit 13 whereby the valve member 19 will be positioned relative to the valve seat 18 depending upon the position of the diaphragm means 21 in the actuator unit 13.

The pilot valve means or unit 12 includes a housing means 47 that projects partially into an opening 48 formed in the closed end 49 of the housing part 33 of the actuator unit 13 and is secured thereto in any suitable manner.

The housing means 47 of the pilot valve unit 12 includes a valve seat 50 separating an inlet nipple 51 from the outlet nipple 44, the valve seat 50 being adapted to be opened and closed by a movable disc valve member 52 normally urged to its closed position by a compression spring 53. The valve member 52 of the pilot valve unit 12 is controlled by a hollow valve member 54 having one end 55 projecting through the valve seat 50 and engaging the valve member 52 while the other end 56 thereof is enlarged and engages a flexible diaphragm 57 of a diaphragm stack 58 that comprises another diaphragm 59 separated from the first diaphragm 57 by a spacer means 60. The spacer means 60 has a passage 61 therein that leads to a central opening 62 in the diaphragm 57 and to a vent opening 63 in the housing means 47 for a prupose hereinafter described, the enlarged end 56 of the hollow valve member 54 being large enough to close off the opening 62 in the diaphragm 57 when seated thereagainst in the manner illustrated for a purpose hereinafter described.

The diaphragm stack 58 of the pilot valve unit 12 is interconnected by post means 64 to a feedback diaphragm 65 carried by the housing means 47 at the lower end thereof for a purpose hereinafter described.

A relatively large coiled compression range spring 66 is disposed in the atmospheric chamber 39 of the actuator unit 13 and has one end 67 bearing against the movable diaphragm means 21 thereof and the other end thereof bearing against the closed end 49 of the housing part 33 whereby the force of the range spring 66 tends to urge the diaphragm means 21 downwardly and thereby maintain the valve member 19 in its closed position against the valve seat 18 as illustrated.

A coiled compression feedback spring 69 is also disposed in the atmospheric chamber 39 of the actuator unit 13 and is concentrically mounted within the larger coiled range spring 66, the coiled compression feedback spring 69 having one end 70 thereof bearing against the diaphragm means 21 of the actuator unit 13 and the other end 71 thereof bearing against the feedback diaphragm 65 of the pilot valve unit 12 for a purpose hereinafter described.

It is believed that by concentrically mounting the feedback and range springs 69 and 66 as well as projecting part of the housing 47 of the pilot unit 12 concentrically within the coiled range spring 66 in the manner illustrated, the pilot operated valve positioner 11 is rendered substantially small and compact to operate in a manner now to be described.

Assume that a pressure supply 73 is interconnected to the inlet nipple 51 of the pilot valve unit 12 of the pilot operated valve positioner 11 of this invention. Also, assume that a changeable pressure signal source 23 is interconnected to the nipple 22 of the pilot valve unit 12.

For example, the pressure supply 73 can comprise the air pump of the internal combustion engine control system of the aforementioned co-pending patent application while the source 23 can comprise the signal source produced by its engine control system of the aforementioned co-pending patent application.

In any event, an increasing pressure signal into a signal chamber 72 of the pilot valve unit 12 defined between the housing means 47 thereof and the upper diaphragm 59 of the diaphragm stack 58 will tend to urge the diaphragm stack 58 downwardly in opposition to the force of the compression spring 53 tending to maintain the valve member 52 in its closed position against the valve seat 50 as well as in opposition to the force of the feedback spring 69 tending to maintain the diaphragm feedback 65 in an up position thereof. As long as the valve member 52 remains in the closed condition against the valve seat 50, the force of the pneumatic signal in the chamber 72 is insufficient to cause a repositioning of the valve positioner 11 of this invention.

However, when the force of the pneumatic signal in the chamber 72 is sufficient to open the valve member 52 away from the valve seat 50 of the pilot unit 12, the pressure source at the inlet nipple 51 is adapted to be interconnected to the outlet nipple 44 whereby the conduit means 43 directs the fluid pressure into the chamber 40 of the actuator unit 13 to act against the diaphragm means 21 and tend to move the same upwardly in opposition to the force of the compression spring 66 as well as in opposition to the smaller force of the feedback compression spring 69.

When the pressure in the chamber 40 is sufficient to move the diaphragm means 21 upwardly in opposition to the spring forces, the diaphragm means 21 moves upwardly and pulls the valve stem 20 and valve member 19 therewith to open the valve seat 18 a certain amount. The upward movement of the diaphragm means 21 continues until the force of the feedback compression spring 69 being compressed between the feedback diaphragm 65 and the upwardly moving diaphragm means 21 is sufficient to move the feedback diaphragm 65 upwardly to permit the valve member 52 to again close against the valve seat 50 as illustrated whereby the supply of air pressure to the chamber 40 of the actuator 13 is now terminated and the diaphragm means 21 remains in its new position to hold the valve member 19 in a certain open position relative to the valve seat 18. Thus, the open valve seat 18 is now adapted to supply fluid, such as the internal combustion engine exhaust gas, at the inlet 16 to the outlet 17 thereof at a certain rate in accordance with the force of the pneumatic signal in the signal chamber 72 of the pilot valve unit 12 as previously described, the outlet 17 being adapted to direct the fluid flow therefrom back to the intake manifold of the internal combustion engine.

A subsequent change in the magnitude of the pneumatic signal being directed to the chamber 72 of the pilot valve unit 12 cause a further repositioning of the valve member 19 relative to the valve seat 18. For example, a further increase in the magnitude of the signal to the chamber 72 again causes further opening of the valve member 19 relative to the valve seat 18 in the manner previously described by causing a reopening of the valve member 52 to permit an additional amount of fluid pressure to be directed to the chamber 40 until the feedback spring 69 again recloses the valve member 52 as previously described. Conversely, a decrease in the magnitude of the pneumatic signal in the signal chamber 72 of the pilot valve unit 12 causes the feedback compression spring 69 to move the feedback diaphragm 65 upwardly and through the post means 64 move the upper diaphragm stack 58 upwardly so that the tubular valve member 54 removes away from the closed valve member 52 and permits the outlet nipple 44 to be interconnected through the opening 62 in the diaphragm stack 58 to the vent opening 63 whereby some of the pressure in the actuator chamber 40 is now vented into the atmosphere to reduce the pressure in the chamber 40 so that the force of the compression spring 66 can move the diaphragm means 21 downwardly and, thus, close the valve member 19 toward the valve seat 18 a certain amount. The downward movement of the diaphragm means 21 and, thus, the closing movement of the valve member 19 relative to the valve seat 18 terminates when the reducing force of the compression spring 69 is such that the force of the signal in the signal chamber 72 of the pilot valve means 12 is sufficient to move the diaphragm stack 58 thereof downwardly to close the opening 60 of the diaphragm stack 58 by compressing the tubular valve member 54 between the lower diaphragm 57 and the valve member 52 as illustrated so that the venting of the pressure in the actuator chamber 40 of the actuator unit 13 now ceases and the diaphragm means 21 is held in its new position.

Therefore, it can be seen that the pilot operated valve positioner 11 of this invention is adapted to position the valve member 19 relative to the valve seat 18 in relation to the value of the pneumatic signal being fed to the signal chamber 72 of the pilot unit 12 as previously described.

It is believed that by concentrically mounting the feedback spring 69 in the range spring 66 as well as concentrically disposing part of the housing means 47 of the pilot unit 12 in the range spring 66, a relatively small and compact pilot operated valve positioner 11 is provided that can accurately control the valve unit 14 in the manner previously described without having adverse seal and leakage problems since the valve stem 20 of the valve unit 14 is sealed at the upper end thereof by the diaphragm means 21 of the actuator unit 13 and does not form part of the feedback means for the pilot valve unit 12 as the feedback spring 69 performs such function.

Thus, it can be seen that this invention not only provides an improved pilot operated valve positioner, but also this invention provides an improved method of making the same.

While the form and method of this invention now preferred has been illustrated and described as required by the Patent Statute, it is to be understood that other forms and method steps can be utilized and still fall within the scope of the appended claims.

I claim:

1. In a method of making a pilot operated valve positioner having pilot valve means operated by a pneumatic signal to pneumatically operate an actuator means carrying a main valve member to position the same relative to its main valve seat in a valve unit in relation to the magnitude of said pneumatic signal, said actuator means having a range spring and a feedback spring for said pilot valve means, said springs being coiled compression springs and being substantially concentrically mounted, the improvement comprising the step of disposing part of the housing means of the pilot valve means concentrically within one end of said range spring of said actuator means so that a positioning diaphragm means of said pilot valve means is also concentrically disposed in said one end of said range spring and engages one end of said feedback spring to render said valve positioner relatively small and compact.

2. A method as set forth in claim 1 and including the steps of forming said actuator means with a positioning diaphragm means, and disposing said feedback spring between said positioning diaphragm means of said actuator means and said positioning diaphragm means of said pilot valve means so as to be operatively associated therewith.

3. A method as set forth in claim 2 and including the step of bearing the other opposed end of said feedback spring against said positioning diaphragm means of said actuator means.

4. A method as set forth in claim 2 and including the steps of forming said actuator means with an atmospheric chamber disposed on one side of said positioning diaphragm thereof, and disposing said springs in said atmospheric chamber.

5. The method as set forth in claim 1 wherein said step of disposing part of said housing means of the pilot valve means concentrically within one end of said range spring comprises the steps of telescoping part of said housing means of said pilot valve means within an open end of a housing part of said valve positioner, and securing said telescoped parts together.

* * * * *